United States Patent [19]

Yamada

[11] 4,180,335

[45] Dec. 25, 1979

[54] HIGH SPEED SERIAL PRINTER

[75] Inventor: Kunihiro Yamada, Tokyo, Japan

[73] Assignee: Ricoh Company, Ltd., Tokyo, Japan

[21] Appl. No.: 746,262

[22] Filed: Nov. 30, 1976

[30] Foreign Application Priority Data

Nov. 30, 1975 [JP] Japan .................. 50-143181

[51] Int. Cl.² ................. B41J 19/00; B41J 5/30
[52] U.S. Cl. ............................ 400/320; 400/322
[58] Field of Search .............. 197/19, 60, 66, 82,
    197/89, 176, 20; 340/172.5; 364/900 MS File;
    400/319, 320, 320.1, 322, 323, 328

[56] References Cited

U.S. PATENT DOCUMENTS

| 3,023,876 | 3/1962 | Niccolls | 197/66 |
| 3,063,537 | 11/1962 | Allen | 197/176 X |
| 3,578,129 | 5/1971 | Kato et al. | 197/19 |
| 3,850,279 | 11/1974 | Kolpek | 197/19 |
| 3,858,702 | 1/1975 | Azuma | 197/66 X |
| 3,970,183 | 7/1976 | Robinson et al. | 400/124 |

FOREIGN PATENT DOCUMENTS

1176441 1/1970 United Kingdom .............. 197/176

*Primary Examiner*—Paul T. Sewell
*Attorney, Agent, or Firm*—Frank J. Jordan

[57] ABSTRACT

Carriage space and line feed signals produced between consecutive character print signals are accumulated and logically combined to form a resultant signal rather than being executed as produced. In response to a character print signal, the carriage and line feed are moved in accordance with the resultant signal to the designated position and then the print operation is executed.

15 Claims, 8 Drawing Figures

HIGH SPEED SERIAL PRINTER

BACKGROUND OF THE INVENTION

The present invention relates to a high speed serial printer.

In serial printers known heretofore, an input encoder produces print signals, which order the printer to print a specified character, and carriage space and line feed signals which order the printer to move a printing head left or right or the paper up or down relative to the printing head. Typical carriage space signals include forward space (right), backspace (left) and carriage return. These prior art printers execute each instruction as it is received, even if several carriage space or line feed signals are produced between consecutive print signals. In order to print a column of one-digit numbers in the middle of a page, for example, after a first number is printed the carriage drive mechanism automatically right spaces the printing head by one space in preparation for printing the next character. However, since the next character is to be a number below rather than to the right of the first number, this space operation is unnecessary. After allowing sufficient time for the completion of the right space operation, a carriage return and line space operation is executed so that the printing head is moved to the leftmost character position. After this operation is completed, the printing head is multiple spaced rightwardly to the position which it occupied originally to print the second number.

Since the final position of the printing head is the same as its original position, the right space, carriage return and multiple right space operations constitute totally wasted time since all that was actually required was a single line feed operation. In addition to unnecessarily reducing the speed at which the printer produces useful copy to a highly significant extent, these useless operations increase the noise level of the printer and reduce its service life.

SUMMARY OF THE INVENTION

It is an object of the present invention to provide a serial printer in which the operating speed is substantially increased through the elimination of unnecessary carriage space and line feed operations.

It is another object of the present invention to provide a serial printer in which the noise level is greatly reduced and the service life is substantially increased.

It is another object of the present invention to provide a serial printer in which carriage space and line feed signals produced between consecutive character print signals are accumulated and logically combined to form a resultant signal rather than being executed as produced. In response to a character print signal, the carriage and line feed are moved in accordance with the resultant signal to the designated position and then the print operation is executed.

It is another object of the present invention to provide a generally improved high speed serial printer.

Other objects, together with the foregoing, are attained in the embodiment described in the following description and illustrated in the accompanying drawings.

DESCRIPTION OF THE PREFERRED EMBODIMENTS

While the high speed serial printer of the invention is susceptible of numerous physical embodiments, depending upon the environment and requirements of use, substantial numbers of the herein shown and described embodiment have been made, tested and used, and all have performed in an eminently satisfactory manner.

The present invention will first be described with reference being made to the simplified diagram of FIG. 1. A high speed serial printer 11 incorporating a carriage drive unit of the invention comprises a console 12 which is typically provided with a keyboard (not shown). It is also adapted to receive data from a computer, remote teletype installation or the like.

Whether data is input through the keyboard or through a communication link, the data is applied to an encoder 13. The encoder 13 is designed to process two types of instructions; character print instructions and position control instructions. The position control instructions comprise carriage space and line feed instructions.

The printer 11 further comprises a printing head 14 which is serially (left and right) positioned by means of a carriage 16. The printing head 14 may be of any construction known in the prior art and may include as a printing element a type ball, type wheel, dot matrix array or the like (not shown).

The encoder 13 is arranged to produce, in response to a character print instruction from the console 12, a code on a plurality of output lines which are symbolized by a single line 17 which designate or select the character to be printed. Simultaneously, the encoder 13 produces a print signal in the form of a logical "1" on a line 18. The character designation signal is applied to the printing head 14 and the print signal is applied to a print execute signal generator 19 and a carriage drive signal generator 21.

In response to a carriage space instruction, which may be a right space (forward space), left space (back space) or carriage return instruction, the encoder 13 feeds a pulse to a command position counter 22 on an appropriate line as indicated in the drawing. The counter 22 is an up-down counter and the right, left and return signals are applied to count up, count down and clear inputs of the counter 22 respectively. In addition, the carriage return signal is applied to an input of an OR gate $O_1$, the output of which is applied to the line feed unit (See FIG. 4) for a line feed or space operation. The overflow output of the counter 22 is connected to another input of the OR gate $O_1$.

The command position counter 22 is provided with a capacity equal to the number of character spaces, for example 64 or 80, that the printer 11 is designed to accommodate. The output of the counter 22 is applied to a comparator 23. Where, for example, the counter 22 has maximum binary capacity of 64 and is therefore a six bit counter, the six parallel outputs of the counter 22 are connected to the comparator 23.

An actual position counter 24 which is essentially similar to the counter 22 is connected to the comparator 23 in the same manner as the counter 22. The comparator 23 produces a position error signal which indicates the direction or polarity of difference between the counts in the counters 22 and 24 and applies the same to the carriage drive signal generator 21. In addition, the comparator 23 applies a coincidence signal as a logical "1" to the print execute signal generator 19 when the counts in the counters 22 and 24 are equal.

The carriage drive signal generator 21 feeds carriage drive pulse signals to the carriage 16 to drive the same left or right. These same signals are applied to the actual position counter 24 to cause the same to count up when the carriage 16 is right spaced and count down when the carriage 16 is left spaced.

Figure 4:
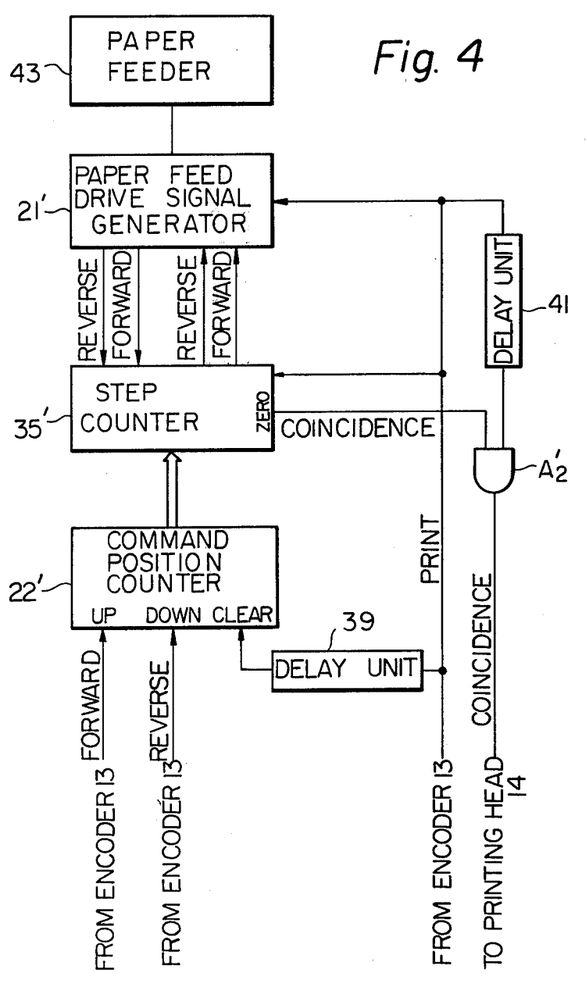
FIG. 4 is a schematic block diagram of a preferred embodiment of a line feed drive unit of the present invention incorporated in high speed serial printer of FIG. 2.

When the printer 11 is energized, the carriage 16 is driven to its leftmost position and the counters 22 and 24 are cleared by a control means which is not shown. In response to a line feed instruction, the line feed drive unit of FIG. 4 executes the same. In response to a carriage drive instruction, the encoder 13 produces an output pulse on the appropriate line which is applied to the command position counter 22. A right space instruction causes the counter 22 to increment, a left space instruction causes the counter 22 to decrement and a carriage return instruction causes the counter 22 to be cleared and a pulse be fed through the OR gate $O_1$ to the line feed drive unit. In accordance with an important feature of the present invention, no physical operation is performed in response to a carriage space or line feed operation. In the case of a carriage space instruction the contents of the command position counter 22 are changed. In the case of a line feed instruction the contents of a similar command position counter of FIG. 4 are changed.

In this manner, carriage space instructions which are produced between consecutive print instructions are accumulated or logically combined in the counter 22, with the count in the counter 22 constituting a resultant signal.

In response to a print instruction, the encoder 13 applies the code of the designated character (letter, number, symbol, etc.) to the printing head 14 which positions the printing element so that the designated character is moved to the printing position. The print signal is applied to the print execute signal generator 19. If the printing head 14 is already in the required position, the counts in the counters 22 and 24 will be equal and the comparator 23 will produce the coincidence signal. In response, the print execute signal generator 19 will actuate a print hammer (not shown) of the printing head 14 to print the selected character.

If the carriage 16 is not in the required position, the counts in the counters 22 and 24 will be unequal and the comparator 23 will not produce the coincidence signal. Instead, the comparator 23 will produce the position error signal which, since the print signal is also applied to the carriage drive signal generator 21, will cause the generator 21 to generate drive pulse signals and apply the same to the carriage 16 and actual position counter 24. These drive signals will cause the carriage 16 and thereby the printing head 14 to move right if the count in the counter 22 is greater than the count in the counter 24 and left if the count in the counter 22 is smaller than the count in the counter 24. Each drive pulse moves the carriage 16 right or left by one character position or space and increments or decrements the actual position counter 24 correspondingly.

When the carriage 16 reaches the required position, the counts in the counters 22 and 24 will be equal and the comparator 23 will no longer generate the position error signal so that the carriage 16 will stop and remain in the required position. In addition, the comparator 23 will generate the coincidence signal which will cause the printing head 14 to print the selected character.

It will be understood that the present system of accumulating and logically combining consecutive carriage drive instructions greatly speeds up the operation of the printer 11 since it is not necessary to wait for the completion of execution of one instruction before executing another instruction. In addition, since the instructions are logically combined and only the resultant instruction is executed, all unnecessary movement of the printing head 14 such as moving in one direction and then back in the opposite direction is eliminated through cancellation.

Figure 2:
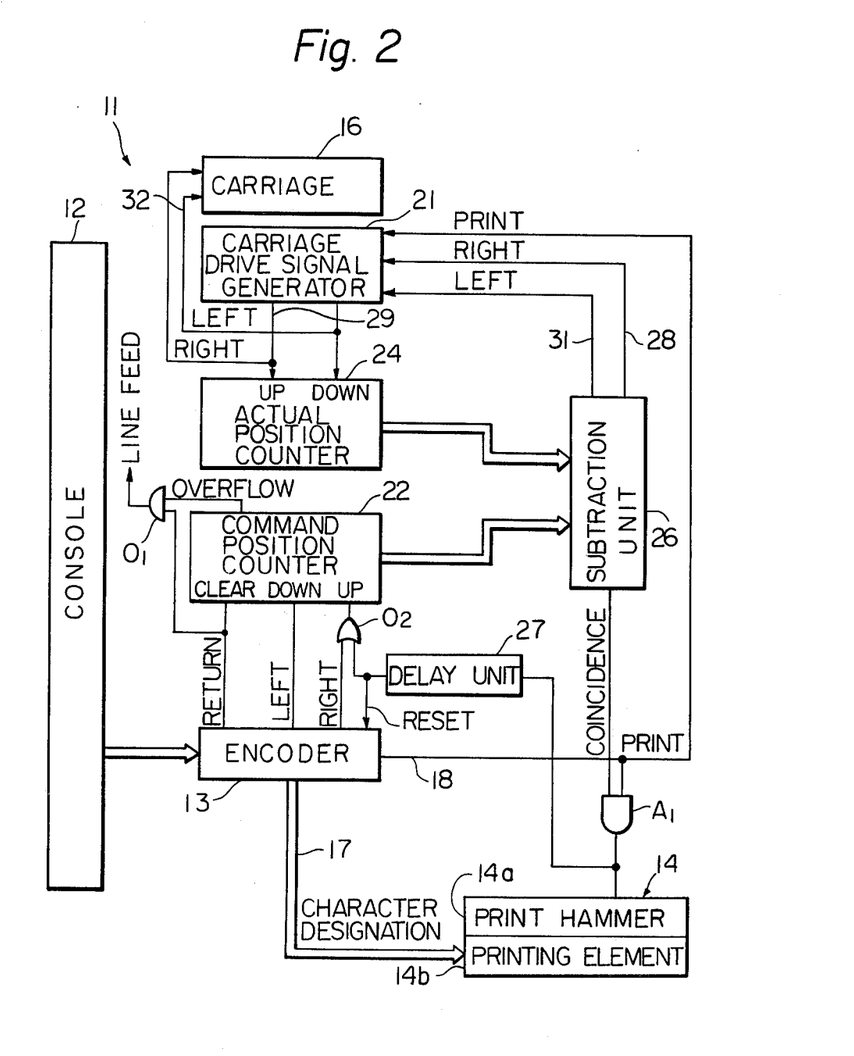
FIG. 2 is similar to FIG. 1 but shows the carriage drive unit in greater detail.

Referring now to FIG. 2, since the basic operation of the apparatus 11 is described hereinabove, such description will not be presented repetitiously and only such description which is necessary to understand the more detailed disclosure of FIG. 2 will be presented hereinbelow.

The printing head 14 is shown as comprising the print hammer 14a and printing element 14b which are referred to above. The printing element 14b is positioned by the character designation code from the encoder 13. The print execute signal generator 19 is shown as simply embodied by an AND gate $A_1$ which has inputs connected to the encoder 13 and the comparator 23, the latter here embodied by a subtraction unit 26, to receive the print and coincidence signals respectively. The output of the AND gate $A_1$ is connected to the print hammer 14a so that the print hammer 14a is actuated when the print and coincidence signals are generated simultaneously.

An additional feature shown in FIG. 2 is the provision of a delay unit 27 and an OR gate $O_2$. The input of the delay unit 27 is connected to the output of the AND gate $A_1$ and the output of the delay unit 27 is connected to an input of the OR gate $O_2$. Another input of the OR gate $O_2$ is connected to the right space output of the encoder 13 and the output of the OR gate $O_2$ is connected to the count up input of the command position counter 22.

In this manner, the command position counter 22 is incremented in response to a right space instruction as described above and is also incremented after a print operation. More specifically, the coincidence signal gated through the AND gate $A_1$ which causes the print hammer 14a to be actuated is also delayed and applied to the counter 22 causing the same to count up and designate the next space for printing the next character. The output of the delay unit 27 is also applied to a reset input of the encoder 13 to terminate generation of the print signal.

The subtraction unit 26 subtracts the count in the actual position counter 24 from the count in the command position counter 22 and produces the coincidence signal if the counts are equal. If the count in the counter 22 is higher than the count in the counter 24, the subtraction unit 26 produces a logical "1" output on a line 28 which energizes the carriage drive signal generator 21 to produce drive pulse on a line 29 which drive the carriage 16 rightward. The pulses on the line 29 are also applied to the actual position counter 24 causing the counter 24 to count up. Similarly, if the count in the counter 22 is smaller than the count in the counter 24, the subtraction unit 26 produces a logical "1" signal on a line 31 which energizes the carriage drive signal generator 21 to produce drive pulses on a line 32 which drive the carriage 16 leftward. The pulses on the line 32 are also applied to the actual position counter 24 causing the counter 24 to count down. When the counts in the counters 23 and 24 are equal, the output of the subtraction unit on both lines 28 and 31 will be logical "0" and the carriage drive signal generator 21 will not produce any drive signals.

Figure 3:
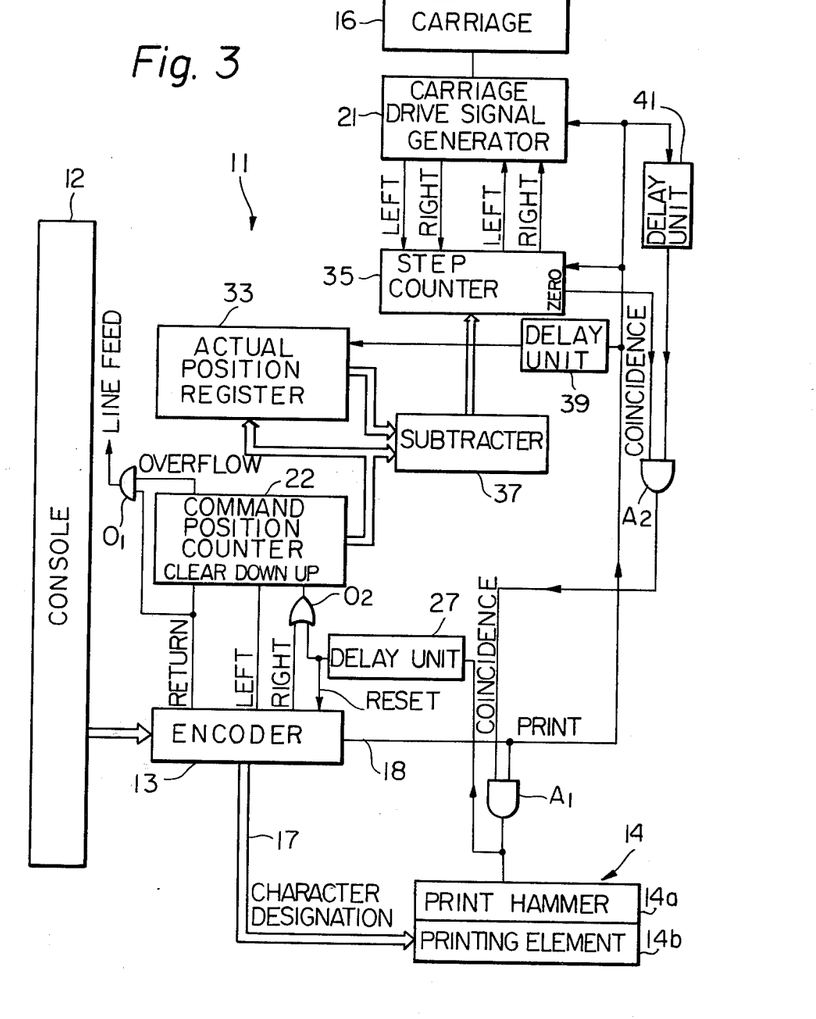
FIG. 3 is a modified form of the carriage drive unit of FIG. 2.

Referring now to FIG. 3 in which a modification of the carriage drive unit of FIG. 2 is illustrated, the actual position counter 24 is replaced with an actual position register 33 and a step counter 35 and the subtraction unit 26 is replaced with the step counter 35 and a subtractor 37. Since the basic operation of the apparatus 11 is described hereinabove, only such description which is necessary to understand the modified part of the disclosure of FIG. 3 will be presented hereinbelow.

The actual position register 33 is connected to the command position counter 22 and the subtracter 37 and stores the actual position of the carriage 16 after a final print operation is completed. The actual position register 33 is also connected to a delay unit 39 which delays the print signal from the encoder 13.

The step counter 35 is connected to the subtracter 37 and the carriage drive signal generator 21. When the content in the step counter 35 is zero, it produces, in response to the print signal from the encoder 13, a coincidence signal as a logical "1" which is fed to the AND gate $A_1$ through an AND gate $A_2$. On the other hand, when the content in the step counter 35 is not zero, it produces the right or left signal which is fed to the carriage drive signal generator 21 which then feeds carriage drive pulse signals to the carriage 16 to drive the same right or left. Thus, the rightward or leftward space movement of the carriage 16 causes the step counter 35 to increment or decrement respectively.

The subtracter 37 subtracts the content in the actual position register 33 from the content in the command position counter 22 and produces a subtraction signal which represents the difference therebetween. As well understood, the carriage 16 is moved right if the difference is positive and left if the difference is negative.

The AND gate $A_2$ has an input connected to the step counter 35 to receive the coincidence signal therefrom and another input connected to an output of a delay unit 41 which delays the print signal from the encoder 13. The output of the AND gate $A_2$ is connected to the input of the AND gate $A_1$ to feed the coincidence signal from the step counter 35 to the printing head 14. It is to be appreciated that the AND gate $A_2$ serves to prevent the coincidence signal produced by the step counter 35 as a logical "1" from being fed to the printing head 14 in the absence of the print signal.

Figure 1:
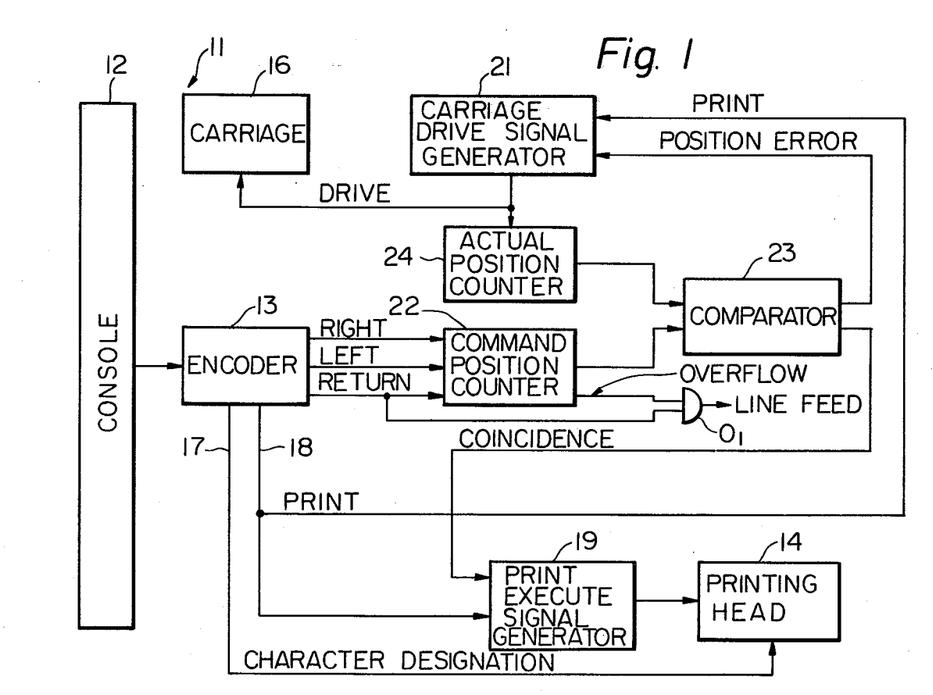
FIG. 1 is a schematic block diagram of a high speed serial printer, particularly showing a preferred embodiment of a carriage drive unit of the present invention.

FIG. 4 illustrates a preferred embodiment of a line feed drive unit incorporated in the high speed serial printer 11 of FIG. 1, 2 or 3. The line feed drive unit for driving a paper feeder 43 is shown as comprising a command position counter 22', a step counter 35', a paper feed drive signal generator 21' and an AND gate $A_2'$ which are essentially similar in configuration and operation to that of the command position counter 22, the step counter 35, the carriage drive signal generator 21 and the AND gate $A_2$ respectively, except that the right and left signals in FIG. 3 are replaced with forward and reverse signals respectively. Therefore, such description will not be presented repetitiously.

In order to assist in understanding the specific feature of the present invention, the difference between the operating speeds in the present invention and the prior art is shown in FIGS. 5a to 5d.

Figure 5A:
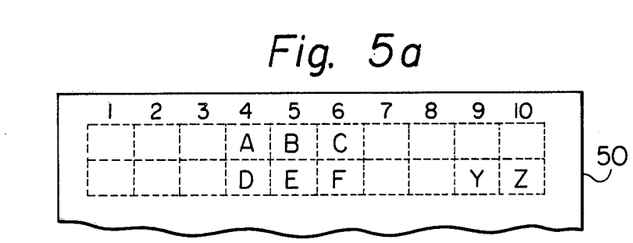
FIGS. 5a to 5d are illustrations of assistance in explaining the operation of the high speed serial printer of the present invention in comparison with that of the prior art printer.
Figure 5B:
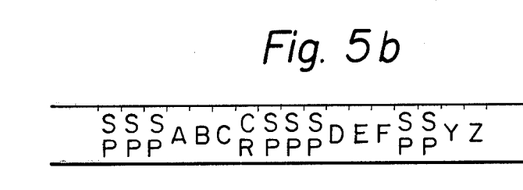

FIG. 5a shows, for example, eight characters A, B, C, D, E, F, Y and Z to be printed at first and second lines only on a paper 50, each line being shown as comprising ten spaces which are rectangularly drawn by dotted lines for the convenience of explanation. FIG. 5b shows a signal produced by the console 12 including instructions such as space SP and carriage return CR in addition to the designated characters A, B, C, D, E, F, Y and Z.

Figure 5C:
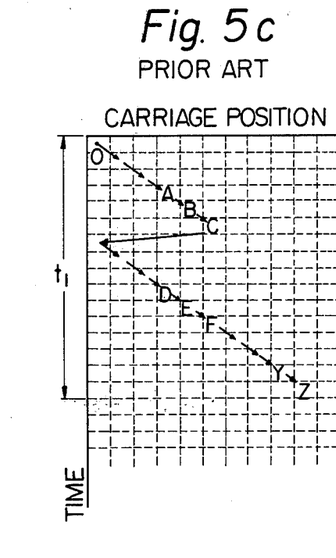
Figure 5D:
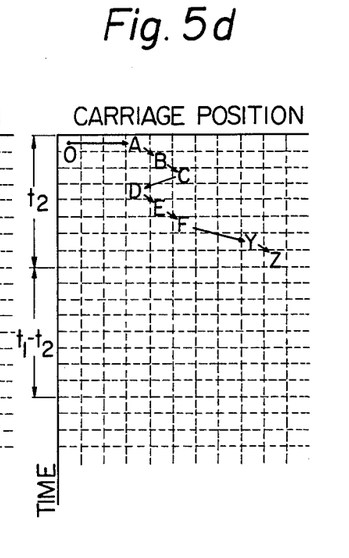

FIG. 5c shows the movement of a carriage of the prior art printer from the original uppermost and leftmost position designated by a reference mark O to the final print position shown by the character Z while the printer is operated in response to the signal shown in FIG. 5b. Similarly, FIG. 5d shows the movement of the carriage 16 of the printer 11 of the present invention. Both in FIGS. 5c and 5d, the abscissa shows position of the carriage and the ordinate shows time. Further, each arrow shown is corresponding to one space movement of the carriage.

It will be clearly understood from FIGS. 5c and 5d that the carriage of the prior art printer is moved rightward space by space in response to all the space instructions SP of the signal shown in FIG. 5b, whereas the carriage 16 of the present invention is directly moved so as to skip over a chain of spaces from the original leftmost position O to the final position for the character Z. When comparing the present invention with the prior art, therefore, it will be seen that the operation speed in the present invention is considerably increased through the elimination of unnecessary carriage space operations. All the times which are required for the completion of the prior art operation in the prior art and the present invention are shown in FIGS. 5c and 5d by $t_1$ and $t_2$ respectively. It will be noticeable that the time $t_2$ of the present invention is greatly shorter than the time $t_1$ of the prior art. In other words, the operation time is greatly reduced by the present invention by the difference $t_1 - t_2$. It is accordingly to be appreciated that the utility of the present invention is obvious.

Furthermore, it is to be appreciated that many additional features, such as tabulation, may be provided to the basic printer 11. It is also possible to substitute, for the actual position counter 24, a sensor (not shown) which directly senses the position of the carriage 16 and produces a binary output corresponding thereto.

Many other modifications will become possible for those skilled in the art after receiving the teachings of the present disclosure without departing from the scope.

What is claimed is:

1. A serial printer comprising:
   a carriage supporting a printing head for printing characters;
   drive means for positioning the printing head;
   encoder means for producing print signal comprising character print instructions and drive signals comprising carriage space instructions;
   first computing means for deriving a resultant drive signal from drive signals produced prior to any print signal;
   second computing means for sensing an actual position of the printing head;
   comparator means for comparing the actual position of the printing head with a command position of the printing head designated by the resultant drive signal and producing a coincidence signal when the actual position coincides with the command position and a position error signal when the actual position is unequal to the command position; and
   control means for applying the position error signal to the drive means in response to the print signal and applying the print signal to the printing head in response to the coincidence signal;
   whereby the printing head is directly moved from the actual position to the command position while skipping all of carriage spaces between the actual position and the command position and stopped to print a character only when the character print instructions are produced, and the printing head is physically stationary when the carriage space instructions only are produced.

2. A serial printer as in claim 1, in which the first computing means comprises a command position up-down counter for accumulating a logical sum of the drive signals.

3. A serial printer as in claim 2, in which the drive signals comprise a forward space signal, a backward space signal and a return signal which cause the command position counter to count up, count down and clear respectively.

4. A serial printer as in claim 2, in which the second computing means comprises an actual position up-down counter, the comparator means being responsive to counts in the command position and actual position counters and producing the coincidence signal in response to equality thereof.

5. A serial printer as in claim 4, in which the comparator means is further connected to control the drive means to cause the printing head to space forward when the count in the command position counter is greater than the count in the actual position counter and to space backward when the count in the command position counter is smaller than the count in the actual position counter.

6. A serial printer as in claim 5, in which the comparator means comprises a subtraction unit.

7. A serial printer as in claim 3, in which the control means is further operative to apply a forward space signal to the command position counter at a predetermined time interval after applying the print signal to the printing head.

8. A serial printer as in claim 1, in which the encoder means is further operative to apply a character selection signal to the printing head in simultaneity with producing the print signal.

9. A serial printer as in claim 1, in which the control means comprises an AND gate having an input connected to the encoder means to receive the print signal, another input connected to the comparator means to receive the coincidence signal and an output connected to the printing head.

10. A serial printer as in claim 1, in which the drive signals further comprise line feed instructions, the printer further comprising a paper feeder, drive means for driving the paper feeder to feed the paper up and down relative to the printing head, third computing means for deriving a second resultant drive signal from the drive signals produced prior to the print signal and fourth computing means for sensing an actual position of the paper feeder and producing a coincidence signal when the actual position coincides with a command position of paper feeder by the resultant drive signal.

11. A serial printer as in claim 10, in which the third computing means comprises a second command position up-down counter for accumulating a logical sum of the drive signals.

12. A serial printer as in claim 11, in which the drive signals comprise a forward signal and a reverse signal which cause the second command position counter to count up and count down respectively.

13. A serial printer as in claim 11, in which the fourth computing means further comprises a step counter which produces the coincidence signal when the content therein is zero in response to the print signal.

14. A serial printer comprising:
   a printing head;
   drive means for positioning the printing head;
   encoder means for producing print signals and drive signals;
   first computing means for deriving a resultant drive signal from drive signals produced prior to a print signal, said first computing means comprising a command position up-down counter for accumulating a logical sum of the drive signals;
   second computing means for sensing an actual position of the printing head, said second computing means comprising an actual position register and a step counter;
   comparator means for comparing the actual position of the printing head with a command position of the printing head designated by the resultant drive signal and producing a coincidence signal when the actual position coincides with the command position and a position error signal when the actual position is unequal to the command position, said comparator means comprising a subtracter and the step counter, said subtracter being responsive to the contents in the actual position register and the command position counter to produce a subtraction signal and the step counter being responsive to the print signal and the subtraction signal to produce the coincidence signal when the content therein is zero; and
   control means for applying the position error signal to the drive means in response to the print signal and applying the print signal to the printing head in response to the coincidence signal.

15. A serial printer comprising:
   a printing head;
   drive means for positioning the printing head;
   encoder means for producing print signals and drive signals;
   first computing means for deriving a resultant drive signal from drive signals produced prior to a print signal, said first computing means comprising a command position up-down counter for accumulating a logical sum of the drive signals, said drive signals comprising a forward space signal, a backward space signal and a return signal which cause the command position counter to count up, count down and clear respectively;

second computing means for sensing an actual position of the printing head;

comparator means for comparing the actual position of the printing head with a command position of the printing head designated by the resultant drive signal and producing a coincidence signal when the actual position coincides with the command position and a position error signal when the actual position is unequal to the command position; and control means for applying the position error signal to the drive means in response to the print signal and applying the print signal to the printing head in response to the coincidence signal, said control means being further operative to apply a forward space signal to the command position counter at a predetermined time interval after applying the print signal to the printing head, said control means comprising a delay unit having an input connected to the comparator means to receive the coincidence signal and an OR gate having an input connected to an output of the delay unit, the OR gate having another input connected to the encoder means to receive the forward space signal and an output connected to the command position counter.

* * * * *